Jan. 10, 1961 J. G. BRADBURY 2,967,539
PLUG VALVE
Filed April 8, 1957
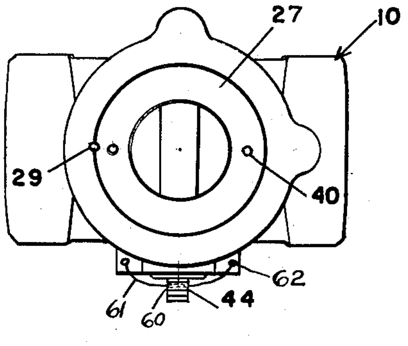
FIG. I
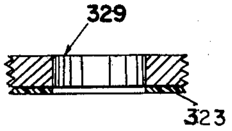
FIG 7
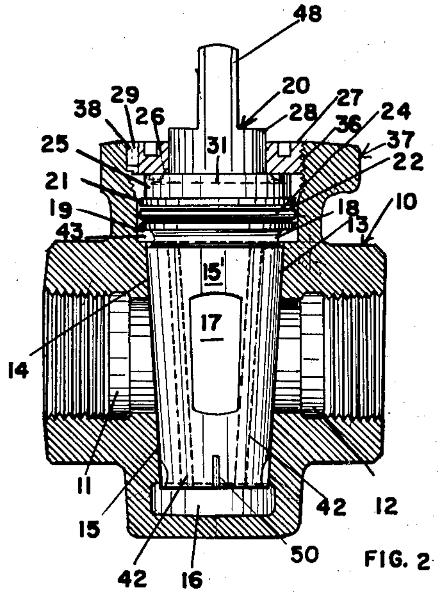
FIG. 2
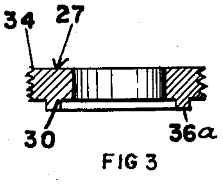
FIG 3
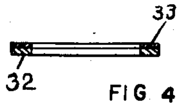
FIG 4
FIG 6
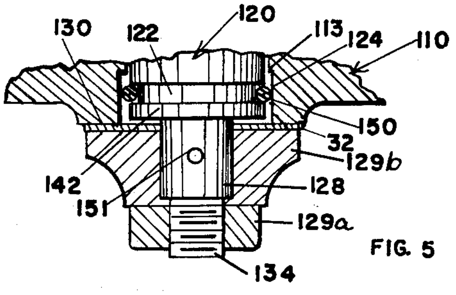
FIG. 5
*INVENTOR.*
JAMES G. BRADBURY
*BY*
Charles L. Lovercheck
attorney United States Patent Office 2,967,539

Patented Jan. 10, 1961

2,967,539

PLUG VALVE

James G. Bradbury, Erie, Pa., assignor to Hays Manufacturing Company, Erie, Pa., a corporation of Pennsylvania Filed Apr. 8, 1957, Ser. No. 651,220

9 Claims. (Cl. 137—246)

This invention relates to valves for controlling fluid under pressure and, more particularly, to valves for controlling the flow of gas under pressure in a system including a gas pipe line.

Plug valves of the type disclosed herein which have been made according to previous designs have a common inherent disadvantage in that the plug is hard to rotate because of the friction between the end cap which holds the plug in place and the end of the plug. Prior plug valves have two main sources of friction which make the valve difficult to operate:

(1) Drag of the plug on its seat; and (2) Friction of the packing and nut or other device which holds the plug in place in the valve body.

In lubricated valves, the lubrication is interposed between the surfaces of the body and plug to reduce the effects of friction; however, in many types of plug valves, the valve is so designed that the lubricant does not come into contact with all of the rotating surfaces between the body and the plug. Therefore, a metal to metal contact is maintained between some of the engaging surfaces and, often, appreciable areas of the plug of the valve and the end cap thereof as well. Consequently, the valves tend to freeze closed.

It has been discovered that by properly designing the greaseways, packing, and plug assembly with a plastic between the nut and the plug, these forces can be reduced. When the pressure between the nut and cap are not too great, a plastic gasket between the nut and cap may be used. Where the pressure between the nut and cap are too great so that the gasket would extrude, a stainless steel or other metal washer may be used and a plastic coating sprayed on the washer or on the nut itself. It has been discovered that "Teflon" will adhere to stainless steel but will ordinarily not adhere to cadmium coated steel and the like.

The present invention contemplates the use of a plastic surface in connection with a relatively moving metal surface in a valve wherein the plastic coating is disposed on the engaging surfaces of the valve plug and on the nut which holds it in place and/or on other engaging surfaces. An example of a plastic material which may be used is "Teflon" which is self-lubricating and which has a very low coefficient of friction between itself and metal.

In valves for gas lines for domestic dwelling and even for industrial use, it is difficult to prevent unauthorized persons from tampering with the valve. Herein is disclosed a valve which is very nearly tamper proof.

It is, accordingly, an object of this invention to provide a valve which is simple in construction, economical to manufacture, and simple and efficient in operation.

Another object of this invention is to provide a valve of the rotating plug type or similar type having an end sealing means which is automatically maintained in pressure tight condition.

A further object of this invention is to provide a valve having end sealing means which is tightened by the pressure exerted thereon by fluid within the lines which may escape outwardly between the engaging surfaces of the valve plug member and its seat.

Still another object of this invention is to provide a valve which is nearly tamper proof by unauthorized persons.

Still a further object of this invention is to provide an improved nut and plug combination in a plug valve which will have an extremely low coefficient of friction between the nut and the valve.

Yet another object of the invention is to provide a particular type of joint between the nut and plug in a plug valve which is self-lubricating.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a top view of a valve according to the invention;

Fig. 2 is a longitudinal cross sectional view of the valve shown in Fig. 1;

Fig. 3 is a longitudinal cross sectional view of the nut shown in the valve in Fig. 2;

Fig. 4 is a cross sectional view of the washer coated with plastic used in the valve shown in Figs. 1 and 2;

Fig. 5 is a partial view of another embodiment of the valve according to the invention;

Fig. 6 is a view of a gasket made completely of plastic material; and

Fig. 7 is a view of a nut having a coating of "Teflon" on one side thereof.

Now with more specific reference to the drawing, Fig. 2 shows a valve body or casting 10 having a plug 20 therein. The body 10 has a passage extending therethrough which comprises a bore having an inlet 11 and an outlet 12 which may be threaded at its outer ends as shown for connection into a piping system. Any other conventional connecting means could be used to connect the valve to a pipe such as flanged connections, brazed connections, or the like.

Extending laterally into and communicating with the bore just described is a lateral bore defined by a tapered valve seat 13 which has an upper portion 14 and a lower portion 15 complementary in shape and formed to receive a tapered portion 15' of the plug 20. The lateral opening which forms the tapered seat 13 extends to the lower part of the valve and is in the form of a blind hole terminating in an enlarged grease receiving portion 16 below the tapered plug 20.

The plug 20 has a port 17 therethrough. The port 17 is parallel to a wrench receiving portion 48 and may be aligned with an inlet and outlet opening when the plug 20 is rotated ninety degrees to the position shown. In the position shown, the port 17 closes the flow passage from the inlet 11 and the outlet 12.

Above the tapered portion 15' of the plug 20 is a reduced size portion 18 which defines the bottom of a groove formed peripherally in the valve. Above the reduced size portion 18 are two enlarged portions 19 and 21 which define a washer receiving groove 22 therebetween which extends peripherally around the valve and receives an O-shaped packing washer 24. Above the groove 22 is a second reduced size portion 25 which extends above a shoulder 26 which forms a flat upwardly facing portion and engages the bottom surface of a nut 27. The shoulder 26 has a groove 31 formed in its surface concentric with the plug 20 and the nut 27 has a depending rim 30 which extends down into the groove 31. The plug 20 terminates at its upper end in a reduced size portion 28 with the wrench receiving portion 48 attached thereto.

A washer 32 is disposed in the groove 31 and an upper surface 33 of the washer 32 has a coating of plastic material. An example of the preferred type of plastic used is the plastic sold under the trade name of "Teflon" which is selected because it has a very low coefficient of friction related to metals such as brass, iron, steel, etc.

The nut 27 has male threads 34 around the periphery thereof. The male threads 34 are received in female threads 36 inside a boss portion 37 which is integral with the body 10 of the valve and forms a part thereof. A hole 38 is formed by the half hole in the boss 37 and another half hole in the nut 27. A pin 29 is driven into the hole 38 with its top flush with the top of the nut 27, locking the nut 27 against rotation when it is tightened into position. A grease fitting 44 has a hole 60 bored therein. A sealing wire 61 is inserted in the hole 60 in the fitting 44 and in holes 62 in the nut 27 and fixed thereto by soldering or the like. Spanner wrench holes 40 are formed in the nut 27 to receive a suitable wrench. In order to remove the nut 27, it is necessary to remove the pin 29. Therefore, the pin 29 will not be removable by the tools found in the ordinary dwelling house and, therefore, the ordinary person will not be able to remove the pin 29 and the valve will be substantially tamper proof.

The body 10 has axially disposed grooves 42 which communicate between the portion 16 and a space 43 above the tapered portion 15' of the plug 20. In order to prevent unauthorized greasing, the fitting 44 is provided which is an ordinary pipe plug. It will have the hole 60 receiving the wire 61 which will also be inserted in the holes 62 and soldered therein. Thus, the fitting 44 cannot be removed without leaving evidence of removal. The grease fitting 44 is provided through which grease may be inserted into the portion 16. This grease will find its way up through the grooves 42 into the space 43 and thereafter exert force on the lower side of the O-shaped washer 24. Fluid in the line connected to the inlet passage 11 and the outlet pasage 12 may find its way up into the space 43 and it will exert a force upwardly on the washer 24 which will cause it to tend to form a tighter seal.

A "Teflon" gasket 129 shown in Fig. 6 could be substituted for the washer 32. Also, a nut 329 in Fig. 7 having sprayed "Teflon" coating 323 could be used instead of the gasket 129.

To assemble the valve, the plug 20 will be inserted in the lateral bore and the nut 27 will be tightened thereon to the desired tension to force the plug 20 to its proper position in the tapered seat 13. A bearing surface **36*a* on the lower side of the rim 30 will bear on the "Teflon" surface 33 in the washer 32. This will engage to form a low frictioned bearing between the nut 27 and the washer 32 and, therefore, between the nut 27 and the plug 20. Therefore, when a wrench is put on the wrench receiving portion 48 and the plug 20 rotated, the bearing surfaces 36*a* and 33 will move relative to each other. The lubricated surface of the portion 15 of the tapered portion 15' of the plug 20 and the inside surface of the seat 13** will have a film of grease therebetween and, consequently, a low friction, freely operable valve will result.

Slots 50 are formed in the lower end of the plug 20 and communicate with the grooves 42 only when the ports 17 are aligned with the passages 11 and 12 since the grooves 42 terminate short of the lower end at the portion 16 so that grease will not find its way from the portion 16 to the grooves 42 and thence to the port 17 when the port 17 passes over the grooves 42, thereby preventing grease from entering the port 17.

In the embodiment of the invention shown in Fig. 5, a valve body 110 is shown in partial view. A lateral bore 113 has an enlarged portion 150 at the lower end thereof which receives a lower end 142 of a tapered plug 120. The lower end 142 of the tapered plug 120 has a peripheral groove 122 therein which receives an O-shaped packing washer 124. The lower end 142 of the plug 120 has a reduced size end 128 thereon which receives a gasket **129*b* and the washer 32 (shown in Fig. 3) with the "Teflon" surface 33 on the upper side of the washer 32 which engages a lower surface 130 of the valve body 110. An extreme lower end 134 of the plug 120 is threaded to receive a nut 129*a*. The nut 129*a* forces the gasket 129*b* up into engagement with the washer 32, thereby forcing the washer 32 into engagement with the lower surface 130 of the valve body 110**.

When the plug 120 is rotated, the gasket **129*b* being keyed thereto by a pin 151, the gasket 129*b* rotates with the plug 120 and the friction between the lower surfaces of the washer 32 and the gasket 129*b* rotates the washer 32 with it and causes the "Teflon" coated surface 33 to slide on the lower surface of the valve body 110, thereby reducing the friction therebetween since a space 150 is relieved and does not engage the plug 120 itself and the upper end of the valve can be so made that it will also not ride into engagement with the valve body 110. Therefore, the valve plug 120** will rotate smoothly and with very low friction.

In the embodiment of the invention shown in Fig. 7, the nut 329 will be applied to the valve instead of the nut 27. "Teflon" coating 323 will be sprayed on the nut 329 itself and it will engage the shoulder 26 of the plug 20 in Fig. 2 or, when used with the embodiment shown in Fig. 5, the coating 323 will engage the surface 130. In this case, the groove 31 can be omitted from the plug.

The advantages of the washer in Fig. 4 and the nut in Fig. 2 are two fold:

(1) The coating of "Teflon" has a low coefficient of friction; and (2) The thin coating will not extrude under ordinary pressures.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body member having a longitudinal bore, a tapered lateral bore extending laterally across said longitudinal bore closed at one end, the walls of said lateral bore constituting a plug seat, a tapered valve plug disposed in said seat and rotatable therein and having a port alignable with said longitudinal bore, the opposed surfaces of said seat and said plug making sealing engagement with each other over their major axial extent, the surface of one end of said plug being generally cylindrical, two axially spaced circumferential grooves in said cylindrical surface of said plug adjacent one end of said seat and said plug, a cylindrical counterbore in said lateral bore in said body member in the end thereof opposite said closed end, the grooved end of said plug being disposed in said counterbore, an O-shaped packing washer disposed in the outer of said grooves in said plug and engaging the inner surface of said counterbore, and axial grooves in said seat in said body member conducting grease from the lower end thereof to said counterbore in said body member.

2. The valve recited in claim 1 wherein the lower end of said lateral bore terminates in an enlarged size compartment, means is provided in said body member to introduce grease into said compartment, and a slot in said plug communicates with said compartment and said grooves in said body member when said plug is in closed position to conduct grease from said compartment to said grooves.

3. The valve recited in claim 1 wherein the upper end of said valve plug has an upwardly facing shoulder thereon, and a nut has a bore therein receiving the upper end of said plug, said nut being threadably supported in said lateral bore, and a plastic material is disposed between said nut and said plug.

4. The valve recited in claim 3 wherein said shoulder has a groove therein and a rim on said nut in said groove, said plastic material is "Teflon" and is in the form of a thin coating on said nut.

5. The valve recited in claim 4 wherein the lower surface of said rim is coated with "Teflon."

6. The valve recited in claim 4 wherein a hole in said body member extends out parallel to the axis of said plug, half in said nut and half in said body member, and a pin in said hole to lock said nut against rotation relative to said body member.

7. The valve recited in claim 3 wherein said plastic material is in the form of a washer shaped gasket of "Teflon" material disposed concentric with said plug and between said nut and said plug.

8. The valve recited in claim 3 wherein said plastic material is in the form of a thin film of "Teflon" sprayed on the adjacent surface of said nut and said nut is made of metal.

9. The valve recited in claim 1 wherein a second plug is threadably disposed in a threaded bore in said valve body member, a lateral hole in said second plug, a wire through said lateral hole, the ends of said wire being fixed to said body member, said threaded bore communicating with the inside of said body member.

References Cited in the file of this patent

UNITED STATES PATENTS

| | | |
|---|---|---|
| 2,033,371 | Benoggio | Mar. 10, 1936 |
| 2,090,743 | Bard | Aug. 24, 1937 |
| 2,182,930 | Nordstrom | Dec. 12, 1939 |
| 2,217,056 | Johnson | Oct. 8, 1940 |
| 2,495,595 | Mueller | Jan. 24, 1950 |
| 2,505,138 | O'Donnell | Apr. 25, 1950 |
| 2,596,730 | Seinfeld | May 13, 1952 |
| 2,653,791 | Mueller | Sept. 29, 1953 |
| 2,699,798 | Hawkins | Jan. 18, 1955 |
| 2,746,478 | Johnson | May 22, 1956 |
| 2,760,515 | Carle | Aug. 28, 1956 |
| 2,807,511 | Fleming | Sept. 24, 1957 |
| 2,829,668 | Mueller | Apr. 8, 1958 |
| 2,844,162 | Hulslander | July 22, 1958 |
| 2,868,221 | Eichenberg | Jan. 13, 1959 |
| 2,898,081 | Johnson | Aug. 4, 1959 |

OTHER REFERENCES

Homestead (published by Homestead Valve Co.), 1955 (pp. 2–3 relied on). (Copy in Div. 39.)